United States Patent

[11] 3,557,321

[72] Inventor Yowan Takao
Tokyo, Japan
[21] Appl. No. 769,343
[22] Filed Oct. 21, 1968
[45] Patented Jan. 19, 1971
[73] Assignee Nippon Electronics Co., Ltd.
[32] Priority Oct. 25, 1967, Apr. 22, 1968
[33] Japan
[31] 42/68339 and 43/26578

[54] SYSTEM FOR DETECTING A MAGNETIC THIN FILM
4 Claims, 5 Drawing Figs.

[52] U.S. Cl. .......... 179/100.2, 324/34
[51] Int. Cl. .......... G11b 15/02, G11b 5/30, G01r 33/04
[50] Field of Search .......... 179/100.2CF, 100.2S, 100.2; 324/34, (Inquired)

[56] References Cited
UNITED STATES PATENTS

| | | | |
|---|---|---|---|
| 2,625,607 | 1/1953 | Eckert, Jr. et al. | 179/100.2 |
| 2,703,714 | 3/1955 | Demby et al. | 179/100.2 |
| 2,875,429 | 2/1959 | Quade | 179/100.2 |

*Primary Examiner*—Bernard Konick
*Assistant Examiner*—Robert S. Tupper
*Attorneys*—Bierman and Bierman and Harry C. Bierman and Jordan B. Bierman

ABSTRACT: A system for detecting the presence of magnetic layers on a web comprising an oscillator, a coil to vary the oscillator frequency with inductance variation, means for vibrating the web to cause inductance variation and deviation of oscillation frequency, a frequency discriminator connected to the oscillator output to produce a voltage signal and means for reading out recorded information.

Fig.1
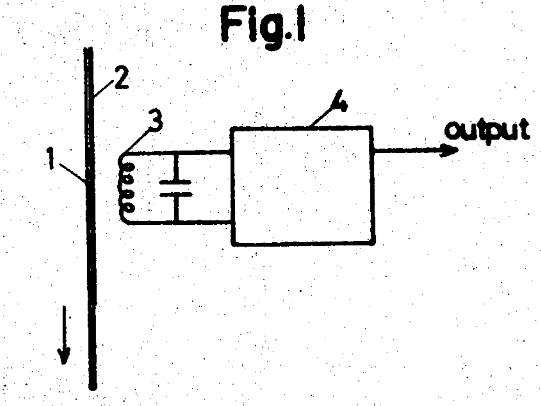
Fig.2
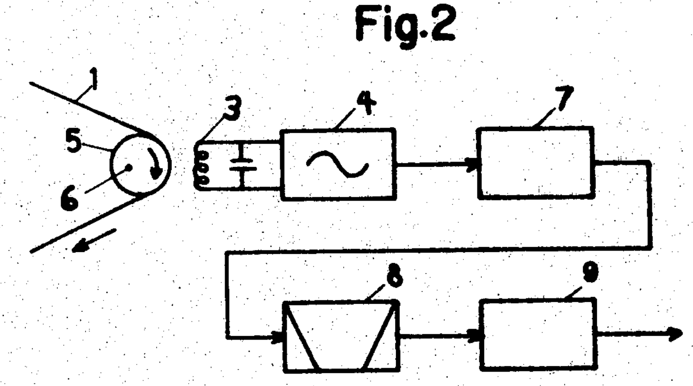
Fig.3 Fig.4
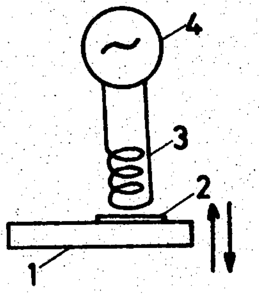
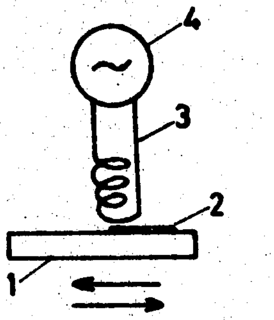
YOWAN TAKAO
INVENTOR
BY Bierman & Bierman
ATTORNEYS

INVENTOR
YOWAN TAKAO

SYSTEM FOR DETECTING A MAGNETIC THIN FILM

The invention relates generally to a system for detecting a magnetic thin film on a nonmagnetic band or web, and more particularly to such detection of a magnetic sound track on talkie films.

Talkie films presently available have either magnetic or optical sound tracks, and they are both in common use. Often necessity occurs, as in television stations, to compile films of different acoustic recording systems into a single continuous film. On play back of such integrated film, different reproduction means must be used in accordance with the recording system in which a part being played has been recorded. Usual practice heretofore has been to use an optical scanner which senses a difference of transmittivity between magnetic and optical sound tracks. However, this requires a distinct separation of transmittivity between track materials of both kinds, and where such distinction is not provided as by reason of recording conditions, an erroneous switching of the reproduction means may be caused. In addition, transparent magnetic material has become available by recent development and when such material is incorporated in the sound track, the optical scanning technique will be inoperable. Use of a magnetic head would appear to be a simple solution to the above problem, but abrasion between an optical sound track and the gap member of the magnetic head is severe enough to render the latter inoperative within a very short period, and the optical track is also damaged. In moving picture projectors, it is imperative to keep the magnetic head retracted from contact with an optical sound track.

Therefore, it is apparent that there has been a need in the art for an improved system which detects the presence of a magnetic sound track on talkie films.

It is an object of the invention to provide a system for detecting the presence of a magnetic thin film irregularly distributed on a nonmagnetic band, without contact therewith.

The invention will be described below in more detail with reference to the drawings in which:

FIG. 1 is a schematic view illustrating the principle of system according to the invention;

FIG. 2 is a block diagram of the system;

FIGS. 3 and 4 are schematic views showing two different manners of operating the system.

Figure 5:
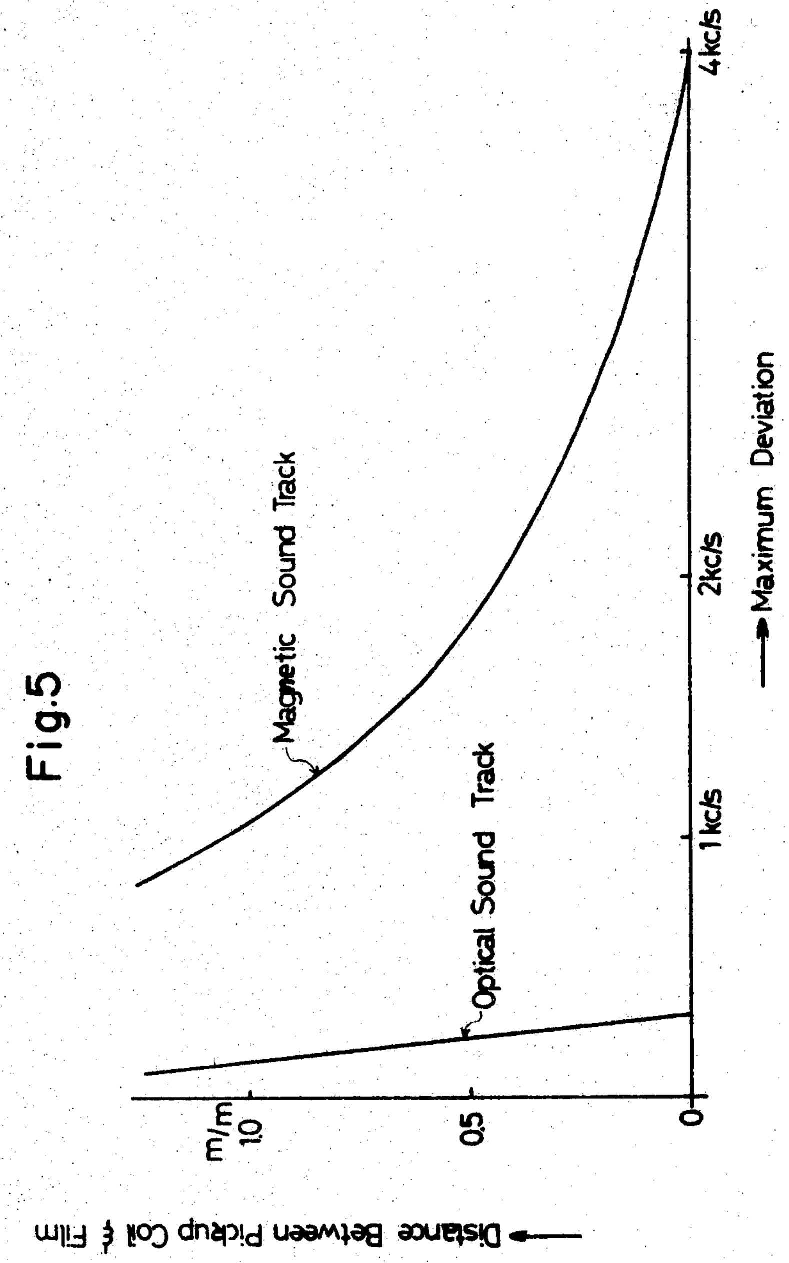
FIG. 5 is a graph showing the maximum frequency deviation plotted against the distance between the film and the pickup coil.

Referring to FIG. 1, a talkie film 1 carries along its length a magnetic recording layer 2 alternately with an optical recording layer, and a pickup coil 3 is located adjacent the film 1. The coil 3 is connected with an oscillator 4, but may be a part such as a tank circuit thereof. Conveniently, the oscillator 4 is a self-excited oscillator operated at a frequency in the region of shortwave, for example, 5 to 10 megacycles per second. While the film 1 is advancing in the direction indicated by an arrow or when it stays at rest, a part adjacent the coil 3 of the film 1 is subjected to mechanical vibration in the direction of thickness, as shown in FIG. 3, at a suitable frequency which may be several tens or hundreds of cycles per second. As the distance between the film 1 and the coil 3 is varied by such vibration, this causes a change in the frequency of the oscillator output. It will be appreciated that when there is a magnetic layer 2 on the film 1 adjacent the coil 3, the resulting change or deviation of frequency will be greater as compared with such change when the magnetic layer 2 is not positioned near the coil 3. Thus there is obtained in the oscillator output a clear indication as to the presence or absence of the magnetic layer, such indication being given by the differential magnitudes of frequency deviation as between the presence and absence of the magnetic layer.

FIG. 2 shows in block form a system for producing a signal which indicates the presence of a magnetic layer 2 on the film 1. A cam 5 is carried on a drive shaft 6 adjacent the coil 3 and the film 1 runs past the cam. In use, the shaft 6 is rotated continuously and thus the distance between the coil and the film on the cam undergoes periodic variation. The output of the oscillator 4 is connected with a frequency discriminator 7, of which output is connected with a band-pass filter 8 which is in turn connected with an amplifier and level detector circuit 9. The output signal from the circuit 9 is used to change over reproduction means. The filter 8 is arranged to pass signals of a predetermined frequency range, which depends upon the frequency of vibration or the number of rotation of the cam 5.

FIG. 4 shows another manner of operation where the film 1 is subjected, adjacent to coil 3, to crosswise vibration, that is, vibration in the direction of width of the film. As will be noted in FIG. 4, the magnetic layer is usually provided in strip form along one edge of the film 1. Preferably, the coil 3 is made in a small diameter, about 2 mm. for example, and is positioned above the film so as to be centered on the side edge of the magnetic layer 2 that is remote from said one side edge of the film. Then it will be understood that by suitable choice of the coil diameter and the amplitude of lateral vibration, lateral vibration of the film 1 below the coil 3 results in a large variation of the inductance of the coil 3 when there exists a magnetic layer 2 on the film, since in one direction of vibration the layer 2 tends to move out of the sectional area of the coil and then in the reverse movement it tends to fill the area. The maximum deviation of the oscillation frequency resulting from such variation of the inductance of the coil 3 depends upon various factors, and inter alia, upon the distance between the film 1 and the coil 3, as depicted in FIG. 5. Such deviation determines the sensitivity of the system. In an example, the coil 3 used in a tank circuit tuned to 10 megacycles per second was positioned at a distance of 0.3 mm. from a coating of ferric oxide on the film 1, and the maximum frequency deviation obtained was about 3 kilocycles per second. The maximum frequency deviation obtained when the film without magnetic strip came opposite to the coil 3 was substantially smaller. In FIG. 4, the distance between the coil and the film substrate remains unchanged upon lateral vibration thereof. This improves the signal-to-noise ratio, because the movement of the film substrate has no substantial influence upon the frequency of the oscillator 4.

It will be appreciated that the voltage output from the frequency discriminator 7 will have a magnitude that is proportional to the maximum frequency deviation as depicted in FIG. 5, and since the voltage output will be greater when the film 1 carries a magnetic layer thereon than when not, the circuit 9 senses the level difference and operates proper reproduction means in accordance with the output. The filter 8 is included to exclude any noise signals which will have frequency components other than the repetitive frequency of the voltage signal obtained from the frequency discriminator when the film 1 carries a magnetic layer as it moves past the coil 3.

It will be noted that a self-excited oscillator is subject to frequency variation by ambient temperature, supply voltage and film materials. Such variation of carrier frequency is superimposed on the deviation of oscillation frequency that is caused by the presence of a magnetic layer on the vibrating film. However, under normal situations, the variation of carrier frequency will have lower frequency components than the repeating frequency of the frequency deviation and thus can be filtered out by the band-pass filter 7, thereby rendering the system insusceptible to variations of ambient temperature, supply voltage and film materials.

I claim:

1. A system for detecting the presence of magnetic layers irregularly and interruptedly distributed on a continuous, nonmagnetic web, comprising a self-excited oscillator of variable frequency, a coil forming part of the tank circuit of the oscillator so as to vary the oscillation frequency thereof with the variation of the inductance, said coil being positioned close to the path of the web but not in contact with said web, means for subjecting the web to vibration relative to the coil so as to cause a change in the inductance of the coil and a deviation of the oscillation frequency, said deviation being substantially greater when said web carries a magnetic layer thereon adjacent the coil than when not, a frequency discriminator connected to the output of the oscillator for providing a voltage signal, a magnetic readout means responsive to the voltage signal for operating said magnetic readout to read out information recorded on the magnetic layer.

2. A system according to claim 1 in which the vibration of the web is in the direction of the width of the web.

3. A system according to claim 1 in which the magnetic layers are arranged on the web along one side edge thereof and the coil is substantially centered on the side edge of the magnetic layer that is remote from said one edge of the web.

4. A system according to claim 1, which includes a filter connected to the output of the frequency discriminator and passing the voltage signal of a predetermined frequency range dependent upon the frequency of said vibration.